(12) United States Patent
Nishikawa

(10) Patent No.: US 10,356,713 B2
(45) Date of Patent: Jul. 16, 2019

(54) RESOURCE CONTROL DEVICE, SYSTEM, METHOD AND RECORDING MEDIUM

(71) Applicant: NEC CORPORATION, Tokyo (JP)

(72) Inventor: Tomohiro Nishikawa, Tokyo (JP)

(73) Assignee: NEC CORPORATION, Minato-ku, Tokyo (JP)

( * ) Notice: Subject to any disclaimer, the term of this patent is extended or adjusted under 35 U.S.C. 154(b) by 0 days.

(21) Appl. No.: 15/960,643

(22) Filed: Apr. 24, 2018

(65) Prior Publication Data
US 2018/0332531 A1    Nov. 15, 2018

(30) Foreign Application Priority Data
May 15, 2017  (JP) ................. 2017-096506

(51) Int. Cl.
*H04W 52/02* (2009.01)
*G06F 9/455* (2018.01)
*H04W 88/08* (2009.01)

(52) U.S. Cl.
CPC .... *H04W 52/0206* (2013.01); *G06F 9/45533* (2013.01); *G06F 9/45558* (2013.01); *G06F 2009/4557* (2013.01); *H04W 88/08* (2013.01)

(58) Field of Classification Search
CPC . H04W 28/0247; H04W 28/08; H04W 16/10; H04W 84/00; H04W 16/18; H04W 24/02; H04W 24/04; H04W 28/0268; H04W 36/22; H04W 36/26; H04W 72/04; H04W 76/10; H04W 88/085; H04W 52/0206; H04W 88/08; G06F 9/45533
See application file for complete search history.

(56) References Cited

U.S. PATENT DOCUMENTS

| 2013/0185729 A1* | 7/2013 | Vasic ............... G06F 9/5072 718/104 |
| 2013/0205011 A1* | 8/2013 | Toumura .......... H04L 67/1031 709/224 |
| 2015/0181317 A1* | 6/2015 | Yin ................. H04Q 11/0062 398/45 |
| 2017/0150399 A1* | 5/2017 | Kedalagudde ....... H04W 28/08 |
| 2017/0230242 A1* | 8/2017 | Hammer ............ H04L 41/0806 |
| 2017/0257424 A1* | 9/2017 | Neogi .................. H04L 43/16 |
| 2018/0046477 A1* | 2/2018 | Aelken .............. G06F 9/5072 |
| 2018/0098327 A1* | 4/2018 | Wei ................. H04W 28/0289 |

FOREIGN PATENT DOCUMENTS

JP    2012-004837 A    1/2012

OTHER PUBLICATIONS

ETSI GS NFV-MAN 001 V1.1.1 "Network Functions Virtualisation (NFV); Management and Orchestration"; dated Dec. 2014.*

* cited by examiner

*Primary Examiner* — Daniel Lai
(74) *Attorney, Agent, or Firm* — Sughrue Mion, PLLC

(57) ABSTRACT

A resource control method according to an example aspect of the invention includes: carrying out a control of an assigned amount of computation resource for each radio control unit of an accommodation station realizing the radio control unit, which controls an antenna function of a radio base station, with a virtual machine technology.

4 Claims, 9 Drawing Sheets

RESOURCE CONTROL DEVICE, SYSTEM, METHOD AND RECORDING MEDIUM

This application is based upon and claims the benefit of priority from Japanese Patent Application No. 2017-096506, filed on May 15, 2017, the disclosure of which is incorporated herein in its entirety by reference.

TECHNICAL FIELD

The present invention relates to a resource control device, a system, a method, and a recording medium in C-RAN (Centralized Radio Access Network).

BACKGROUND ART

When operating a radio base station, it is necessary for an operation side to continuously invest in the radio base station in order to meet a traffic demand which is caused by increase of user traffic in a mobile network. Therefore, a vast amount of OPEX (operating expenditure) and CAPEX (capital expenditure) is necessary.

As a method to solve the above-mentioned problem, a method of introducing a C-RAN (Centralized Radio Access Network) technology and a virtualization technology is exemplified. According to the method, a radio base station function is separated into a control part (DU: Digital Unit) and an antenna part (RU: Radio Unit), and DU is realized by the virtualization technology using VM (Virtual Machine). Thereby, it is possible to carry out centralized management and control of DU with MANO (Management and Orchestration), and consequently it is possible to reduce OPEX, CAPEX, and electric power consumption.

However, according to the above-mentioned method, since it is necessary to carry out manual adjustment of a computation resource (number of CPUs (Central Processing Unit), a memory size, and the like) which is assigned to a virtual node of DU, it cannot be expected to realize reduction of OPEX which is caused by adjusting the computation resource. Moreover, since distribution of the user traffic is largely changed dependently on a time zone or a location, it is difficult to optimize the computation resource of each virtual node on manual.

Meanwhile, according to the method described by a patent literature (PTL) 1, a SON (Self Organizing Network) server collects information from a radio base station, and determines whether to reconstruct a group cell or not based on a totalized result on a relation between a source base station and a destination base station of a moving station to which hand-over is carried out. According to the method, it is possible to carry out reconstruction of the group cell with ease.

[Patent literature 1] Japanese Patent Application Laid-Open Publication No. 2012-004837

However, according to the method described by PTL 1, it is difficult to realize reduction of OPEX which is caused by adjusting the computation resource of the virtual node realizing DU.

SUMMARY

An example object of the present invention is to provide a resource control device, a system, a method, and a recording medium which can reduce OPEX in operating the radio base station.

A resource control device according to an example aspect of the invention includes: a resource control unit that carries out a control of an assigned amount of computation resource for each radio control unit of an accommodation station realizing the radio control unit, which controls an antenna function of a radio base station, with a virtual machine technology.

A resource control method according to an example aspect of the invention includes: carrying out a control of an assigned amount of computation resource for each radio control unit of an accommodation station realizing the radio control unit, which controls an antenna function of a radio base station, with a virtual machine technology.

A computer readable recording medium according to an example aspect of the invention is recorded with a resource control program causing a computer to execute: a resource control function of carrying out a control of an assigned amount of computation resource for each radio control unit of an accommodation station realizing the radio control unit, which controls an antenna function of a radio base station, with a virtual machine technology.

An example advantage according to the invention is to provide a resource control device, a system, a method, and a recording medium which can reduce OPEX in operating the radio base station.

BRIEF DESCRIPTION OF THE DRAWINGS

The above and other objects, features and advantages of the present invention will become more apparent from the following detailed description when taken in conjunction with the accompanying drawings wherein.

EXAMPLE EMBODIMENT

[First Example Embodiment]

A first example embodiment of the present invention will be explained in the following.

Figure 1:
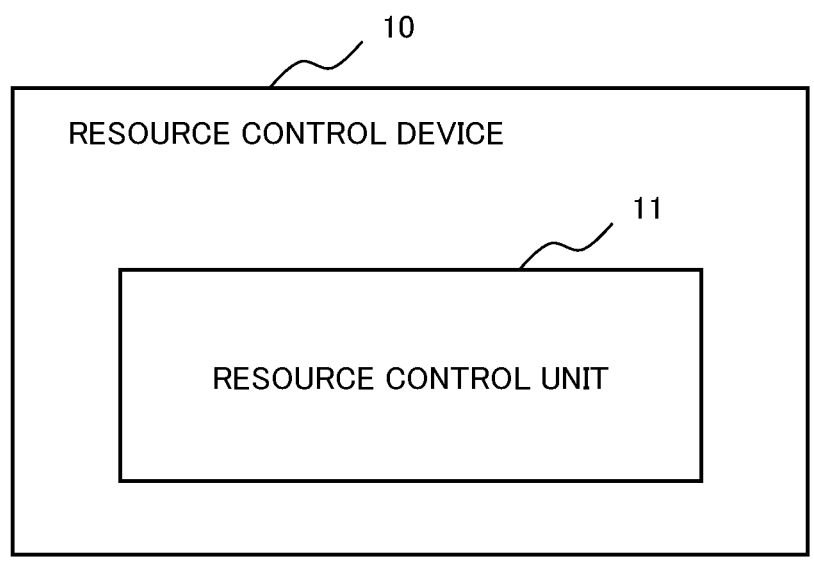
FIG. 1 shows an example of a configuration of a resource control device of a first example embodiment of the present invention.

FIG. 1 illustrates an example of a configuration of a resource control device 10 of the present example embodiment.

The resource control device 10 of the present example embodiment includes a resource control unit 11.

The resource control unit 11 is a part for carries out a control of an assigned amount of computation resource for each radio control unit of an accommodation station realizing the radio control unit, which controls an antenna function of a radio base station, with a virtual machine technology.

By configuring the resource control device 10 as mentioned above, the resource control device 10 controls the assigned amount of computation resource for each radio control unit of the accommodation station realizing the radio control unit, which controls the antenna function of the radio base station, with the virtual machine technology. Thereby, it is possible for the resource control device 10 to automatically control the assigned amount of computation resource of the radio control unit (virtual node). Therefore, it is possible to reduce OPEX in operating the radio base station.

Figure 2:
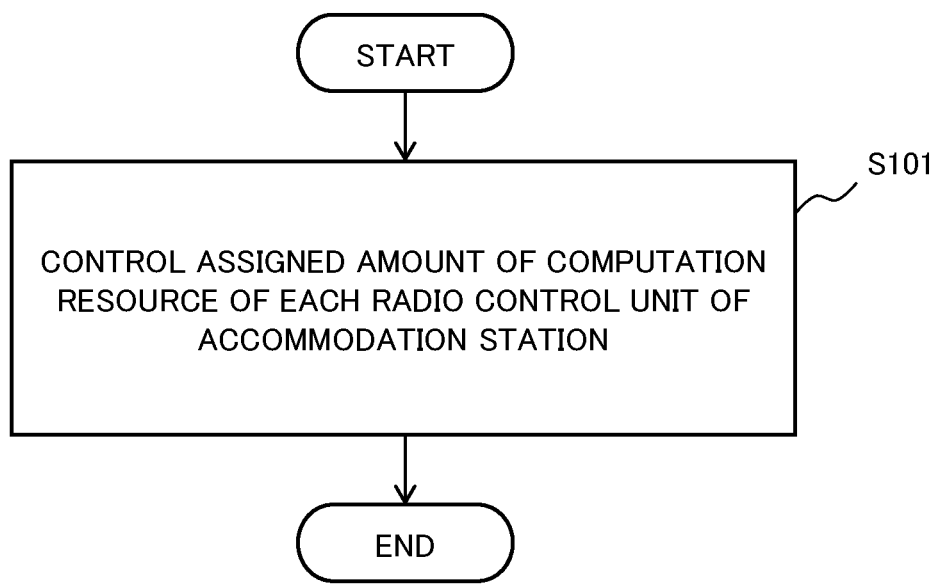
FIG. 2 shows an example of an operation of the resource control device of the first example embodiment of the present invention.

Next, FIG. 2 illustrates an example of an operation of the resource control device 10 of the present example embodiment.

The resource control unit 11 carries out the control of the assigned amount of computation resource for each radio control unit of the accommodation station realizing the radio control unit, which controls the antenna function of the radio base station, with the virtual machine technology (Step S101).

By carrying out the operation as mentioned above, the resource control device 10 controls the assigned amount of computation resource for each radio control unit of the accommodation station realizing the radio control unit, which controls the antenna function of the radio base station, with the virtual machine technology. Thereby, it is possible for the resource control device 10 to automatically control the assigned amount of computation resource of the radio control unit (virtual node). Therefore, it is possible to reduce OPEX in operating the radio base station.

In the first example embodiment of the present invention, as mentioned above, the resource control device 10 controls the assigned amount of computation resource for each radio control unit of the accommodation station realizing the radio control unit, which controls the antenna function of the radio base station, with the virtual machine technology. Thereby, it is possible for the resource control device 10 to automatically control the assigned amount of computation resource of the radio control unit (virtual node). Therefore, it is possible to reduce OPEX in operating the radio base station.

[Second Example Embodiment]

Next, a second example embodiment of the present invention will be explained. In the present example embodiment, the resource control device 10 will be explained more specifically.

Figure 3:
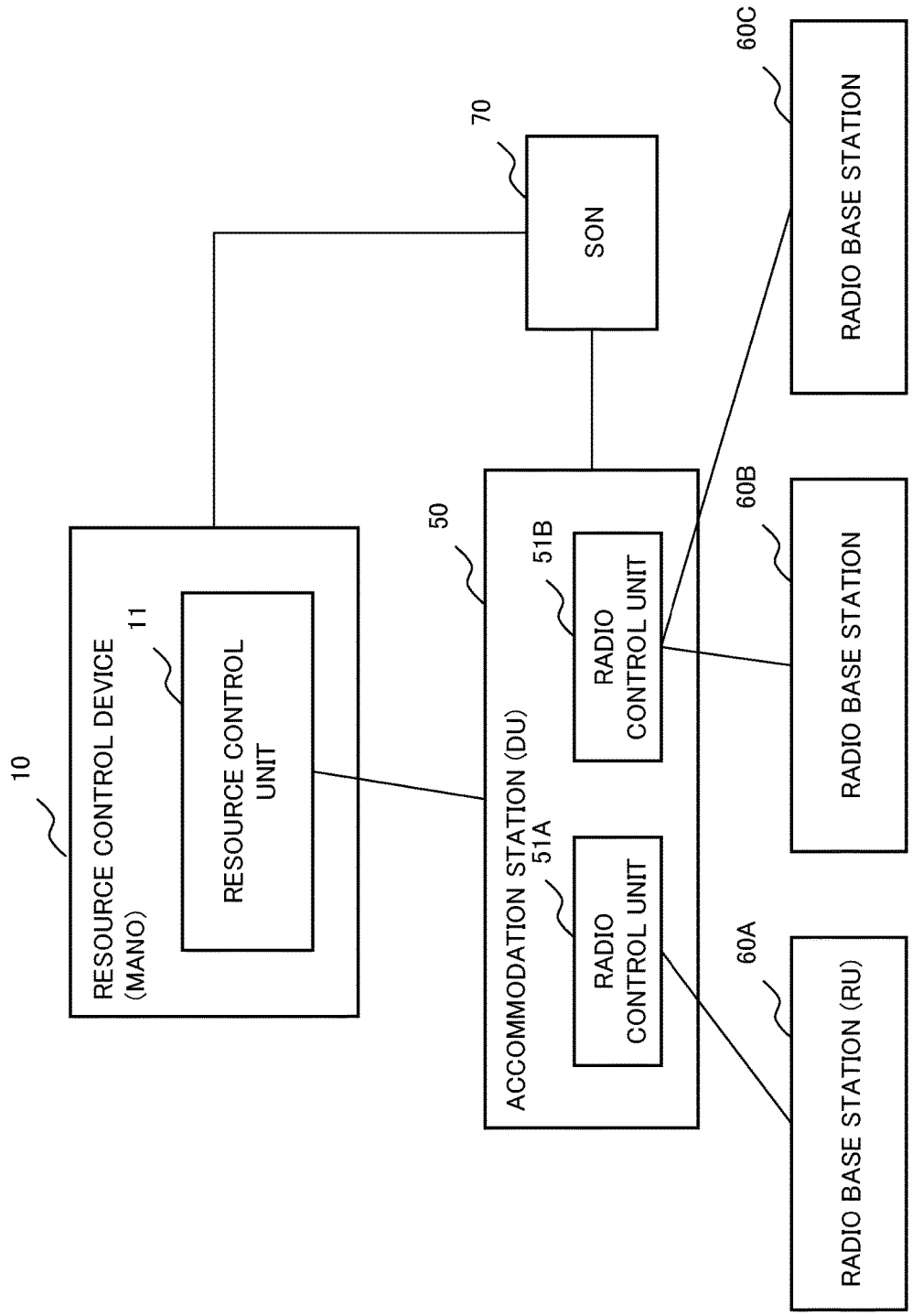
FIG. 3 shows an example of a configuration of a resource control system of a second example embodiment of the present invention.

Firstly, FIG. 3 illustrates an example of a configuration of a resource control system of the present example embodiment.

The resource control system of the present example embodiment includes the resource control device 10, an accommodation station 50, a radio base station 60 (60A, 60B and 60C) and a SON 70.

The radio base station 60 is a part in which an antenna function out of functions of the radio base station is implemented. The radio base station 60 is equivalent to RU of C-RAN. One or more radio base stations 60 can exist in the resource control system.

The accommodation station 50 is a device which controls the radio base station 60. One or more accommodation stations 50 can exist in the resource control system. The accommodation station 50 is equivalent to DU of C-RAN. The accommodation station 50 includes one or more radio control units 51. The radio control unit 51 is a part which controls the radio base station 60. The radio control unit 51 is a virtual node which is realized with the virtual machine technology.

The resource control device 10 is a device which controls an assigned amount of computation resource of each radio control unit 51 of the accommodation station 50. The resource control device 10 is equivalent to MANO which manages and controls the virtual node.

The SON 70 is a device which has a SON function to automatically and optimally set a parameter of the radio base station 60. In the present example embodiment, the SON 70 collects information on each radio base station 60 from the accommodation station 50, and notifies the resource control device 10 of the collected information.

Here, it is also possible that the accommodation station 50 has the SON function and directly notifies the resource control device 10 of the information on the radio base station 60. In this case, the SON 70 is unnecessary.

Next, an example of a configuration of the resource control device 10 of the present example embodiment will be explained with reference to FIG. 3.

The resource control device 10 of the present example embodiment includes the resource control unit 11.

The resource control unit 11 is a part which controls the assigned amount of computation resource for each radio control unit 51 (radio control units 51A and 51B) of the accommodation station 50.

In the present example embodiment, the resource control unit 11 receives information, which the SON 70 collects from the accommodation station 50 and which is related to a processing load of the radio base station 60, from the SON 70. Then, the resource control unit 11 carries out scale-up (Scale-up: increase of number of CPUs and a memory size) and scale-down (Scale-down: decrease of number of CPUs and a memory size) of the computation resource of each radio control unit 51 based on the information on the processing load of the radio base station 60.

As the information on the processing load of the radio base station 60, information which can be collected in the radio base station 60 and the accommodation station 50 can be used. For example, number of terminals of UE (User Equipment: mobile terminal) which are connected with the radio base station 60, information on data traffic of UE, number of times of hand-over occurrence, a failure rate of the hand-over, number of times of Ping-Pong hand-over occurrence, or the like can be used.

For example, when total number of times of hand-over occurrence of the radio base station 60, which is a subordinate of one radio control unit 51, is larger than a predetermined first threshold value, the radio base station 60 which is the subordinate of the radio control unit 51 is in a state that the hand-over of UE occurs frequently. At this time, it is necessary that the radio control unit 51 has a stronger processing ability. Therefore, the resource control unit 11 carries out the scale-up of the computation resource of the wireless control unit 51. Moreover, when total number of times of hand-over occurrence of the radio base station 60, which is a subordinate of one radio control unit 51, is smaller than a predetermined second threshold value, it is not very necessary that the radio control unit 51 has the strong processing ability. Therefore, the resource control unit 11 carries out the scale-down of the computation resource of the radio control unit 51.

By configuring the resource control device 10 as mentioned above, the resource control device 10 controls the assigned amount of computation resource for each radio control unit of the accommodation station realizing the radio control unit, which controls the antenna function of the radio base station, with the virtual machine technology. Thereby, it is possible for the resource control device 10 to automatically control the assigned amount of computation resource of the radio control unit (virtual node). Therefore, it is possible to reduce OPEX in operating the radio base station.

Moreover, the resource control device 10 of the present example embodiment automatically optimizes the computation resource of each radio control unit 51 based on the processing load (for example, number of times of hand-over occurrence of the radio base station 60 which is the subordinate of the radio control unit 51) of the radio control unit 51. Therefore, in an operational aspect, it is possible to restrain a processing delay of the radio control unit 51 beforehand. Moreover, it is possible to restrain electrical power consumption which is caused by assigning excessive resource. Moreover, it is possible to efficiently use a hardware resource of the accommodation station 50.

Moreover, in an aspect of an end user (user of UE), a success rate of the hand-over of UE is improved by reducing the processing load and the delay of each radio control unit 51. Therefore, it is possible to improve communication quality.

Figure 4:
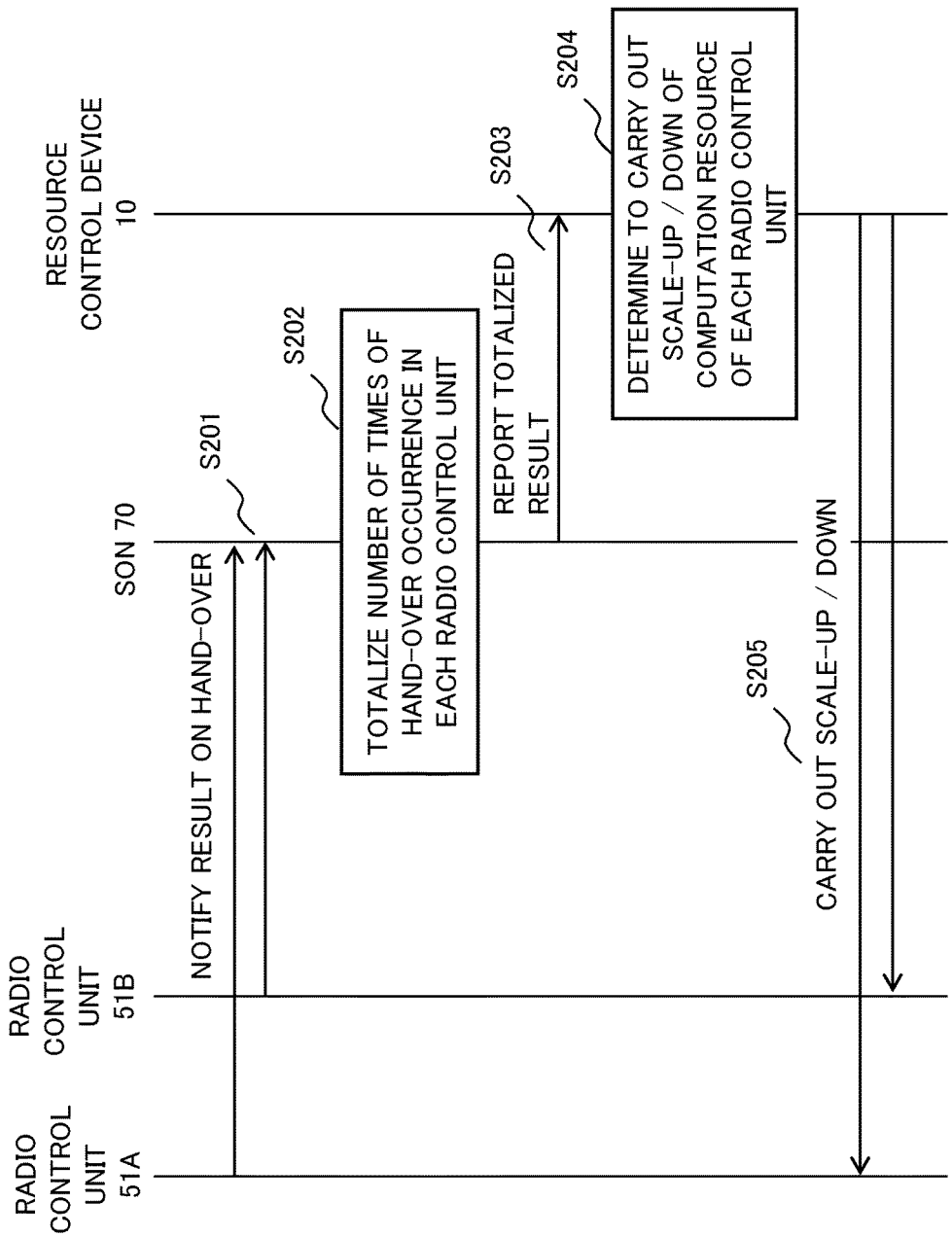
FIG. 4 shows an example of an operation of a resource control device of the second example embodiment of the present invention.

Next, FIG. 4 illustrates an example of operations of the resource control device 10, the accommodation station 50, and the SON 70 of the present example embodiment.

Firstly, the radio control unit 51 (51A and 51B) of the accommodation station 50 notifies the SON 70 of the information on each radio base station 60 which is the subordinate of the radio control unit 51, for example, a result on the hand-over (Step S201). The radio control unit 51 carries out the operation of Step S201 at predetermined timing, for example, at a predetermined time interval, at a time when the hand-over occurs, or the like.

Next, the SON 70 totalizes number of times of occurrence of the hand-over, which is carried out in each radio control unit 51, based on the hand-over result of each radio base station 60 of which the radio control unit 51 notifies the SON 70 (Step S202). Then, the SON 70 reports the totalized result to the resource control device 10 at predetermined timing, for example, at a predetermined time interval, or the like (Step S203).

The resource control device 10 determines control contents (scale-up/scale-down) on the computation resource of each radio control unit 51 based on the totalized result which is reported by the SON 70 (Step S204). Then, according to the determination, the resource control device 10 controls (carries out scale-up/scale-down) the computation resource of each radio control unit 51 (Step S205).

Figure 5:
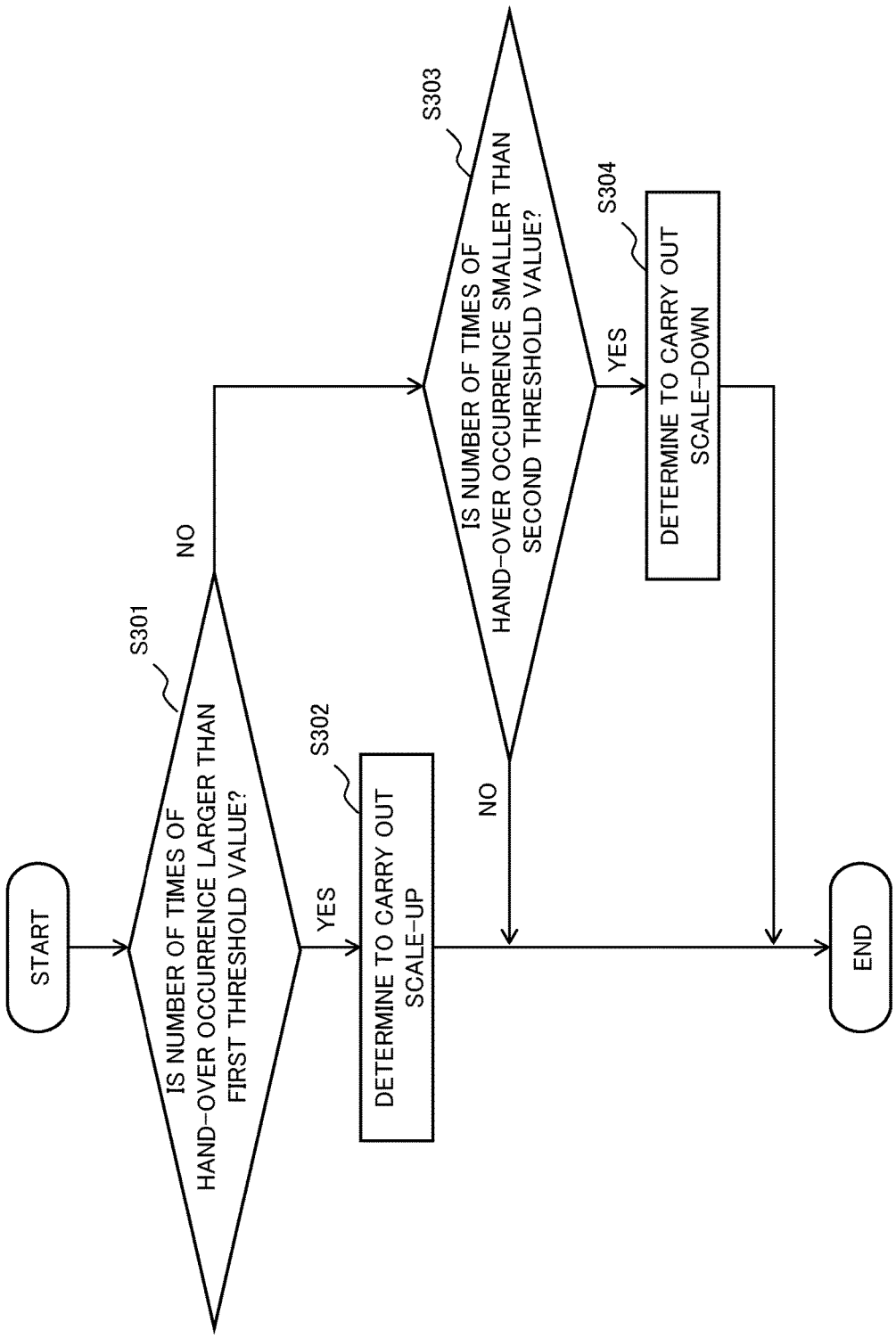
FIG. 5 shows an example of the operation of the resource control device of the second example embodiment of the present invention.

FIG. 5 illustrates an example of an operation which the resource control device 10 carries out in Step S204 of FIG. 4 for determining the control contents of the radio control unit 51. The example is an example of determining the control contents based on the number of times of hand-over occurrence.

When the totalized result on the number of times of hand-over occurrence in each radio control unit 51 is larger than the first threshold value (YES in Step S301), the resource control device 10 determines to carry out the scale-up of the computation resource of the radio control unit 51 (Step S302). Moreover, when the totalized result is smaller than the second threshold value (YES in Step S303), the resource control device 10 determines to carry out the scale-down of the computation resource of the radio control unit 51 (Step S304). Moreover, when the totalized result is equal to or larger than the second threshold value, and equal to or smaller than the first threshold value, the resource control device 10 determines that the computation resource of the radio control unit 51 should be kept unchanged. Here, the first threshold value and the second threshold value are predetermined values which correspond to the computation resource assigned to the radio control unit 51.

Then, the resource control device 10 carries out the control contents, which are determined in Step S204, in Step S205 of FIG. 4.

By carrying out the above-mentioned operation, the resource control device 10 controls the assigned amount of computation resource for each radio control unit of the accommodation station realizing the radio control unit, which controls the antenna function of the radio base station, with the virtual machine technology. Thereby, it is possible for the resource control device 10 to automatically control the assigned amount of computation resource of the radio control unit (virtual node). Therefore, it is possible to reduce OPEX in operating the radio base station.

In the second example embodiment of the present invention, as mentioned above, the resource control device 10 controls the assigned amount of computation resource for each radio control unit of the accommodation station realizing the radio control unit, which controls the antenna function of the radio base station, with the virtual machine technology. Thereby, it is possible for the resource control device 10 to automatically control the assigned amount of computation resource of the radio control unit (virtual node). Therefore, it is possible to reduce OPEX in operating the radio base station.

Moreover, the resource control device 10 of the present example embodiment automatically optimizes the computation resource of each wireless control unit 51 based on the processing load (for example, number of times of hand-over occurrence of the radio base station 60 which is the subordinate of the wireless control unit 51) of the radio control unit 51. Therefore, in the operational aspect, it is possible to restrain the processing delay beforehand. Moreover, it is possible to restrain the electrical power consumption which is caused by assigning excessive resource. Moreover, it is possible to efficiently use the hardware resource of the accommodation station 50.

Moreover, in the aspect of the end user (user of UE), a success rate of hand-over of UE is improved by reducing the processing load and the delay of each radio control unit 51. Therefore, it is possible to improve the communication quality.

[Third Example Embodiment]

Next, a third example embodiment of the present invention will be explained. In the present example embodiment, an example embodiment, in which load distribution is further carried out among a plurality of the accommodation stations 50, will be explained.

Figure 6:
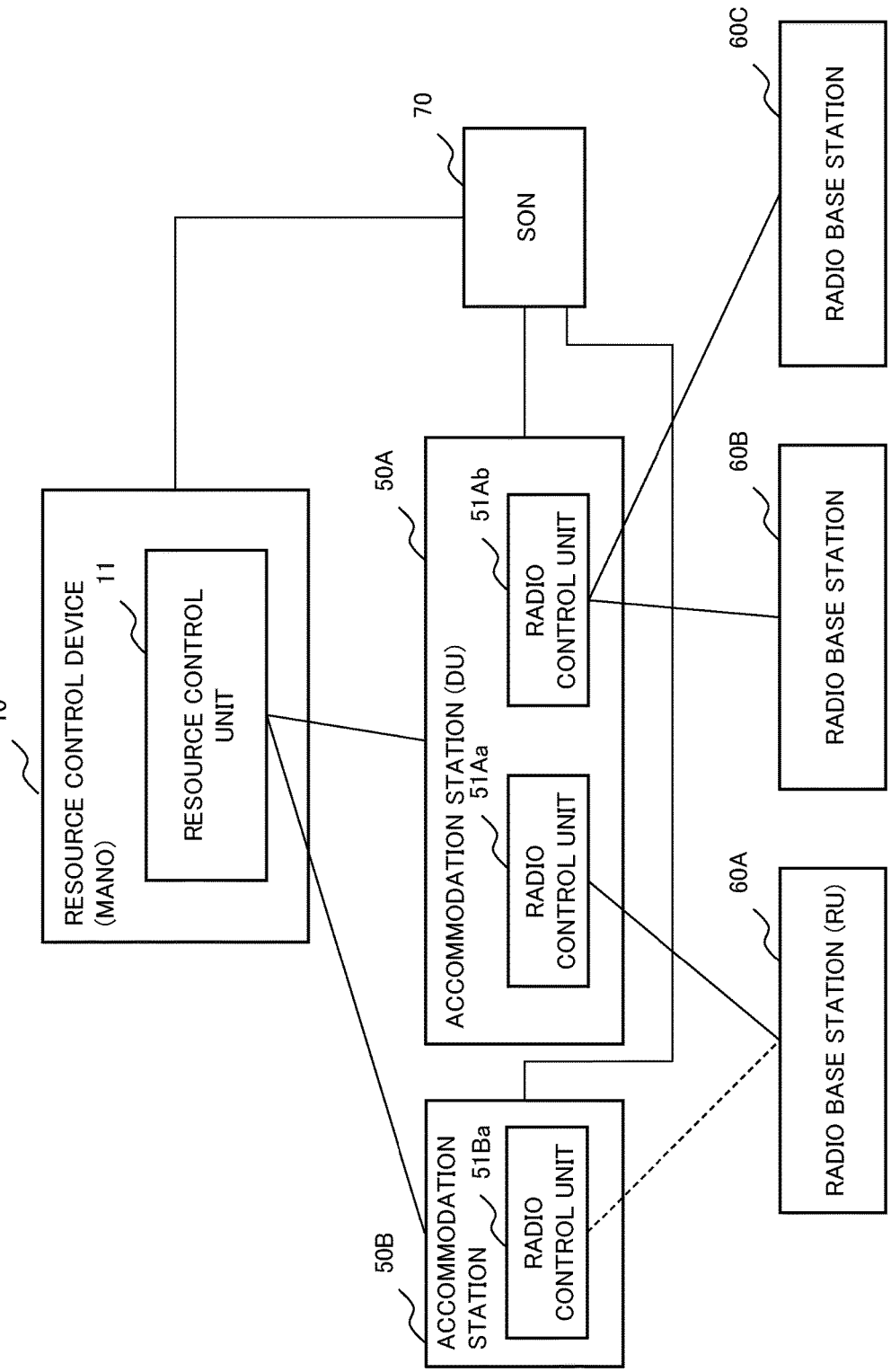
FIG. 6 shows an example of a configuration of a resource control system of a third example embodiment of the present invention.

Firstly, FIG. 6 illustrates an example of a configuration of a resource control system of the present example embodiment. FIG. 6 is different from FIG. 3 in a point that the former includes two accommodation stations 50A and 50B, whereas the latter has one accommodation station 50. The accommodation station 50A includes a radio control unit 51Aa and a radio control unit 51Ab, and the accommodation station 50B includes a radio control unit 51Ba. Since the other parts are the same as those in the second example embodiment, explanation on the part is omitted.

Next, an example of the configuration of the resource control device 10 of the present example embodiment will be explained with reference to FIG. 6.

As well as the resource control unit 11 of the second example embodiment, the resource control unit 11 of the present example embodiment is a part for controlling the assigned amount of computation resource for each radio control unit 51 of the accommodation station 50 (50A and 50B).

Also in the present example embodiment as well as the second example embodiment, the resource control unit 11 receives the information, which the SON 70 collects from the accommodation station 50 (50A and 50B) and which is related to the processing load of the radio base station 60 (60A, 60B and 60C), from the SON 70. Then, the resource control unit 11 carries out the scale-up and the scale-down of the computation resource of each radio control unit 51 based on the information on the processing load of the radio base station 60.

Furthermore, when one radio control unit 51 has the large processing load, the resource control unit 11 of the present example embodiment carries out scale-out (Scale-out: addition of the accommodation station 50 to carry out the load distribution) of the virtual machine of the radio control unit 51 onto another accommodation station 50.

For example, when the processing load of the radio control unit 51 of the accommodation station 50A is not improved due to the large number of times of hand-over occurrence even by carrying out the scale-up, the resource control unit 11 carries out the scale-out of the radio control unit 51 of the accommodation station 50A onto the radio control unit 51 of the accommodation station 50B. Moreover, when the scale-up is carried out frequently, the resource control unit 11 carries out the scale-out.

By configuring the resource control device 10 as mentioned above, the resource control device 10 controls the assigned amount of computation resource for each radio control unit of the accommodation station realizing the radio control unit, which controls the antenna function of the radio base station, with the virtual machine technology. Thereby, it is possible for the resource control device 10 to automatically control the assigned amount of computation resource of the radio control unit (virtual node). Therefore, it is possible to reduce OPEX in operating the radio base station.

Moreover, the resource control device 10 of the present example embodiment carries out the scale-out of the radio control unit 51 according to the processing load and the frequency of the scale-up. Thereby, it is possible to make the accommodation station 50 cope with the larger processing load.

Figure 7:
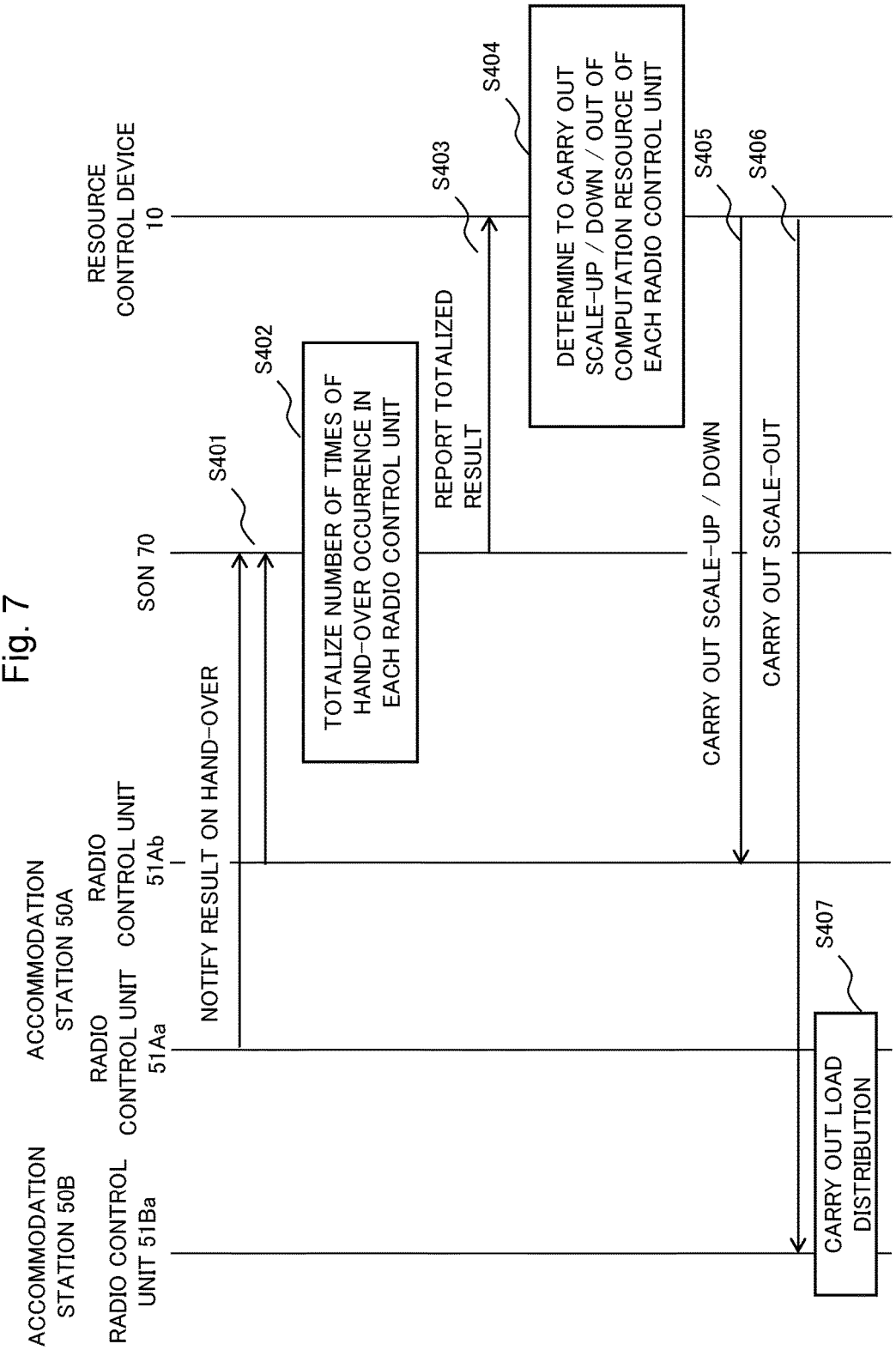
FIG. 7 shows an example of an operation of a resource control device of the third example embodiment of the present invention.

Next, FIG. 7 illustrates an example of an operation of the resource control device 10 of the present example embodiment.

Firstly, the radio control unit 51Aa and the radio control unit 51Ab of the accommodation station 50A notify the SON 70 of the processing loads of the radio base stations 60 which are subordinates of the radio control unit 51Aa and the radio control unit 51Ab, where the processing load is, for example, the number of times of hand-over occurrence (Step S401).

The SON 70 totalizes the number of times of hand-over occurrence of each radio control unit 51 based on the number of times of hand-over occurrence of each radio base station 60 (Step S402), and reports the totalized result to the resource control device 10 at the predetermined timing (Step S403).

The resource control device 10 determines to carry out the scale-up/the scale-down of the computation resource of each radio control unit 51 (51Aa and 51Ab) of the accommodation station 50A based on the totalized result. Moreover, based on the totalized result, the frequency of carrying out the scale-up of each radio control unit 51, or the like, the resource control device 10 determines whether to carry out the scale-out of the radio control unit 51 or not (Step S404).

When the resource control device 10 determines to carry out the scale-up/the scale-down of one radio control unit 51 (in this case, the radio control unit 51Ab), the resource control device 10 carries out the scale-up/the scale down of the radio control unit 51 (Step S405). Moreover, when the resource control device 10 determines to carry out the scale-out of one radio control unit 51 (in this case, the radio control unit 51Aa) since the radio control unit 51 has the large processing load, the resource control device 10 carries out the scale-out of the radio control unit 51 onto the radio control unit 51Ba of the accommodation station 50B (Step S406). Also when the accommodation station 50A is short in a hardware resource, and consequently the scale-up cannot be carried out, the resource control device 10 can carry out the scale-out.

Then, the radio control unit 51Aa of the accommodation station 50A, and the radio control unit 51Ba of the accommodation station 50B carry out the load distribution (Step S407).

Figure 8:
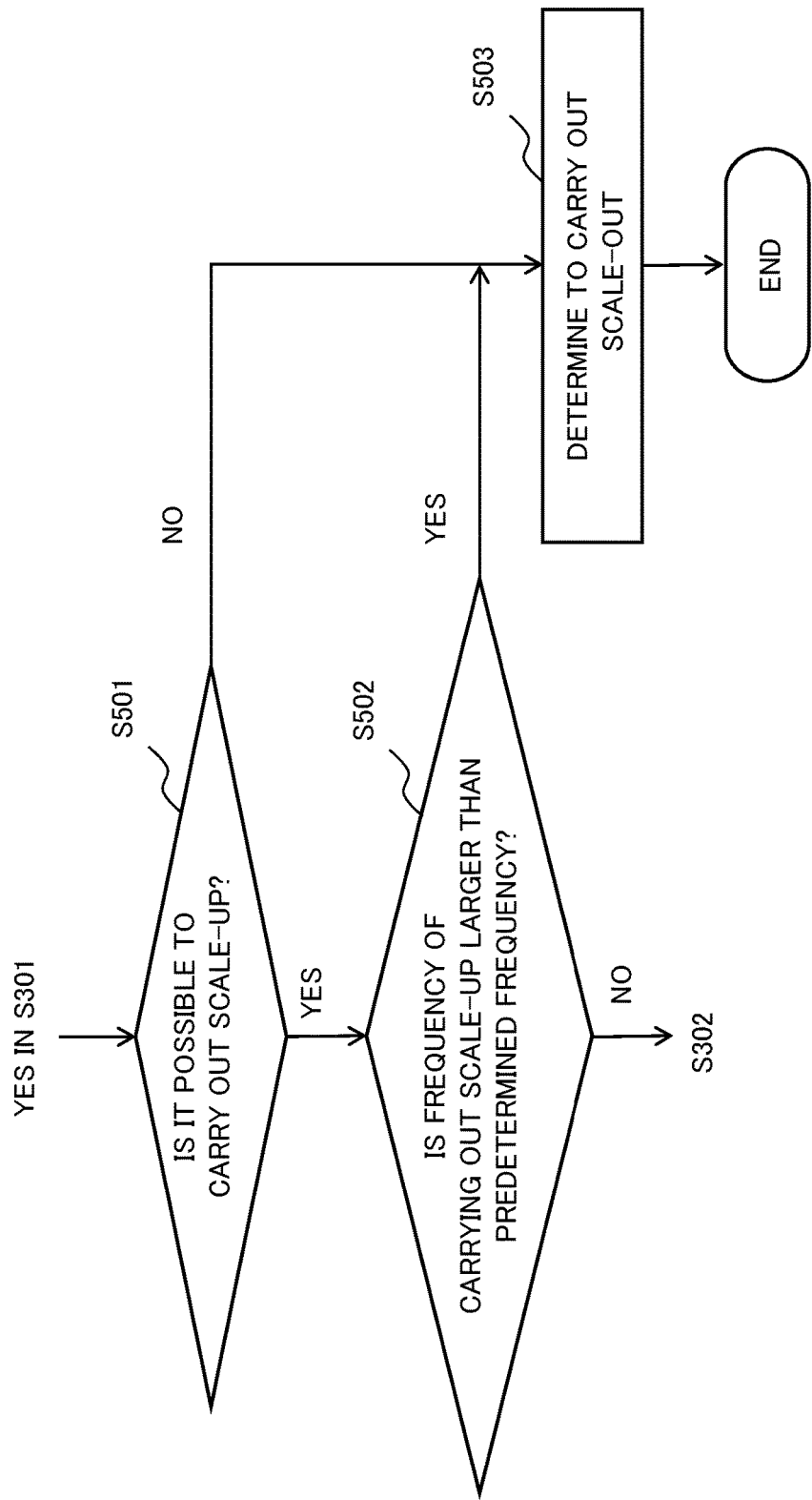
FIG. 8 shows an example of the operation of the resource control device of the third example embodiment of the present invention.

FIG. 8 illustrates an example of an operation for determining control contents which the resource control device 10 carries out in Step S404. The above-mentioned operation is carried out between Step S301 and Step S302 of FIG. 5.

When the number of times of hand-over occurrence is larger than the first threshold value (YES in Step S301), the resource control device 10 determines whether it is possible to carry out the scale-up or not. For example, when the accommodation station 50A has no hardware resource for carrying out the scale-up, when it is impossible to improve the processing load even by carrying out the scale-up, or the like, the resource control device 10 determines that it is impossible to carry out the scale-up.

When it is possible to carry out the scale-up (YES in Step S501), the resource control device 10 determines whether frequency of carrying out the scale-up is larger than predetermined frequency. When the frequency of carrying out the scale-up is equal to or lower than the predetermined frequency (NO in Step S502), the resource control device 10 determines to carry out the scale-up (Step S302).

When it is impossible to carry out the scale-up (NO in Step S501), or when the frequency of carrying out the scale-up is larger than the predetermined frequency (YES in step S502), the resource control device 10 determines to carry out the scale-out.

By carrying out the above-mentioned operation, the resource control device 10 controls the assigned amount of computation resource for each radio control unit of the accommodation station realizing the radio control unit, which controls the antenna function of the radio base station, with the virtual machine technology. Thereby, it is possible for the resource control device 10 to automatically control the assigned amount of computation resource of the radio control unit (virtual node). Therefore, it is possible to reduce OPEX in operating the radio base station.

In the third example embodiment of the present invention, as mentioned above, the resource control device 10 controls the assigned amount of computation resource for each radio control unit of the accommodation station realizing the radio control unit, which controls the antenna function of the radio base station, with the virtual machine technology. Thereby, it is possible for the resource control device 10 to automatically control the assigned amount of computation resource of the radio control unit (virtual node). Therefore, it is possible to reduce OPEX in operating the radio base station.

Moreover, the resource control device 10 of the present example embodiment carries out the scale-out according to the processing load and the frequency of carrying out the scale-up. Thereby, it is possible to make the accommodation station 50 cope with the larger processing load.

[Example of Hardware Configuration]

An example of a configuration of a hardware resource realizing the resource control device (10), which is described in each example embodiment of the present invention, by using one information processing device (computer) will be explained in the following. Here, the resource control device may be realized by using at least two information processing devices which are separated physically or functionally. Moreover, the resource control device may be realized as a dedicated device. Moreover, only some functions of the resource control device may be realized by using the information processing device.

Figure 9:
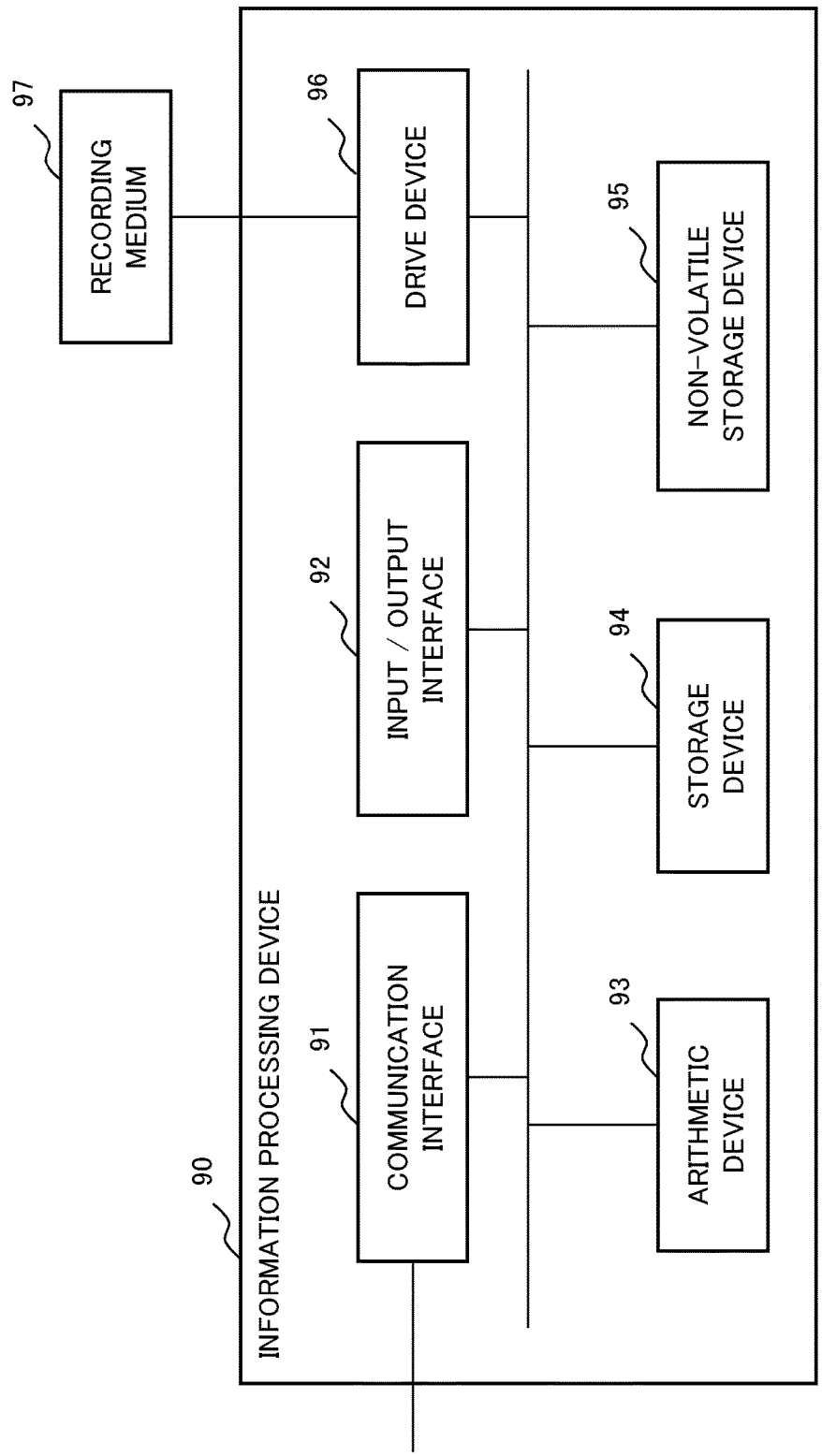
FIG. 9 shows an example of a hardware configuration of each example embodiment of the present invention.

FIG. 9 is a diagram schematically illustrating an example of a hardware configuration of the information processing device which can realize the resource control device of each example embodiment of the present invention. An information processing device 90 includes a communication interface 91, an input/output interface 92, an arithmetic device 93, a storage device 94, a non-volatile storage device 95, and a drive device 96.

The communication interface 91 is a communication means by which the resource control device of each example embodiment communicates with an external device through a wired network and/or a radio network. Here, when realizing the resource control device by using at least two information processing devices, the information processing devices may be communicably connected each other through the communication interface 91.

The input/output interface 92 is a man-machine interface such as a keyboard which is an example of an input device, a display which is an example of an output device, and the like.

The arithmetic device 93 is an arithmetic processing device such as a general purpose type CPU (Central Processing Unit), a general purpose type microprocessor, or the like. For example, the arithmetic device 93 can read various programs which are stored in the non-volatile storage device 95, and put the various programs into the storage device 94, and carry out processing according to the read program.

The storage device 94 is a memory device, which the arithmetic device 93 can refer to, such as RAM (Random Access Memory) or the like, and stores a program, various data, and the like. The storage device 94 may be a volatile memory device.

The non-volatile storage device 95 is a non-volatile storage device such as ROM (Read Only Memory), a flash memory, or the like, and can store various programs, various data, and the like.

The drive device 96 is, for example, a device which processes to read data from a storage medium 97 mentioned later, and to write data into the storage medium 97.

The storage medium 97 is any storage medium, which can record data, such as an optical disk, a magneto-optical disk, a semiconductor flash memory, or the like.

Each example embodiment of the present invention may be realized, for example, by configuring the resource control device through using the information processing device 90 exemplified in FIG. 9, and supplying the resource control device with a program which can realize the function explained in each example embodiment mentioned above.

In this case, it is possible to realize the example embodiment by the arithmetic device 93's executing the program which is supplied to the resource control device. Moreover, it is also possible to configure not all functions but some functions of the resource control device by using the information processing device 90.

Furthermore, a configuration that the above-mentioned program is recorded in the storage medium 97, and is stored appropriately in the non-volatile storage device 95 at a shipment stage, an operation stage, or the like of the resource control device may be used. In this case, as a method for supplying the program, a method, in which the program is installed into the resource control device by using a suitable tool at a production stage prior to the shipment, the operation stage, or the like, may be adopted. Moreover, as the method for supplying the program, a general procedure such as a method, in which the program is downloaded from the outside through a communication line such as the Internet or the like, may be adopted.

While the invention has been particularly shown and described with reference to example embodiments thereof, the invention is not limited to these embodiments. It will be understood by those of ordinary skill in the art that various changes in form and details may be made therein without departing from the spirit and scope of the present invention as defined by the claims.

The whole or part of the example embodiments disclosed above can be described as, but not limited to, the following supplementary notes.

(Supplementary Note 1)

A resource control device comprising:

a resource control unit that carries out a control of an assigned amount of computation resource for each radio control unit of an accommodation station realizing the radio control unit, which controls an antenna function of a radio base station, with a virtual machine technology.

(Supplementary Note 2)

The resource control device according to supplementary note 1, wherein, the resource control unit carries out the control of the assigned amount based on information on a processing load of the radio control unit.

(Supplementary Note 3)

The resource control device according to supplementary note 2, wherein the information on the processing load is information based on at least one out of number of terminals connecting with the radio base station, information on data traffic of the terminal, number of times of hand-over occurrence of the terminal, a failure rate of the hand-over, and number of times of Ping-Pong hand-over occurrence.

(Supplementary Note 4)

The resource control device according to any one of supplementary note 1 to supplementary note 3, wherein the resource control unit carries out the control of the assigned amount by carrying out scale-up, scale-down, or scale-out of the computation resource.

(Supplementary Note 5)

The resource control device according to supplementary note 4, wherein the resource control unit determines whether to carry out the scale-out or not based on frequency of the scale-up.

(Supplementary Note 6)

A resource control system comprising:

the resource control device according to any one of supplementary note 1 to supplementary note 5;

the radio base station; and the accommodation station.

(Supplementary Note 7)

A resource control method comprising:
carrying out a control of an assigned amount of computation resource for each radio control unit of an accommodation station realizing the radio control unit, which controls an antenna function of a radio base station, with a virtual machine technology.

(Supplementary Note 8)

The resource control method according to supplementary note 7, wherein the control of the assigned amount is carried out based on information on a processing load of the radio control unit.

(Supplementary Note 9)

The resource control method according to supplementary note 8, wherein
the information on the processing load is information based on at least one out of number of terminals connecting with the radio base station, information on data traffic of the terminal, number of times of hand-over occurrence of the terminal, a failure rate of the hand-over, and number of times of Ping-Pong hand-over occurrence.

(Supplementary Note 10)

The resource control method according to any one of supplementary note 7 to supplementary note 9, wherein
the control of the assigned amount is carried out by carrying out scale-up, scale-down, or scale-out of the computation resource.

(Supplementary Note 11)

The resource control method according to supplementary note 10, wherein
whether the scale-out is carried out or not is determined based on frequency of the scale-up.

(Supplementary Note 12)

A computer readable recording medium recorded with a resource control program causing a computer to execute:
a resource control function of carrying out a control of an assigned amount of computation resource for each radio control unit of an accommodation station realizing the radio control unit, which controls an antenna function of a radio base station, with a virtual machine technology.

(Supplementary Note 13)

The computer readable recording medium recorded with the resource control program according to supplementary note 12, wherein
the resource control function carries out the control of the assigned amount based on information on a processing load of the radio control unit.

(Supplementary Note 14)

The computer readable recording medium recorded with the resource control program according to supplementary note 13, wherein
the information on the processing load is information based on at least one out of number of terminals connecting with the radio base station, information on data traffic of the terminal, number of times of hand-over occurrence of the terminal, a failure rate of the hand-over, and number of times of Ping-Pong hand-over occurrence.

(Supplementary Note 15)

The computer readable recording medium recorded with the resource control program according to any one of supplementary note 12 to supplementary note 14, wherein
the resource control function carries out the control of the assigned amount by carrying out scale-up, scale-down, or scale-out of the computation resource.

(Supplementary Note 16)

The computer readable recording medium recorded with the resource control program according to supplementary note 15, wherein
the resource control function determines whether to carry out the scale-out or not based on frequency of the scale-up.

The invention claimed is:

1. A resource control device comprising:
a resource controller configured to carry out a control of an assigned amount of computation resource for each radio control unit of an accommodation station realizing the radio control unit, which controls an antenna function of a radio base station, with a virtual machine technology,
wherein the resource controller is further configured to:
carry out the control of the assigned amount by carrying out scale-up, scale-down, or scale-out of the computation resource, and
determine whether to carry out the scale-out or not based on frequency of the scale-up, when it is possible to carry out the scale-up.

2. A resource control system comprising:
the resource control device according to claim 1;
the radio base station; and
the accommodation station.

3. A resource control method comprising:
carrying out a control of an assigned amount of computation resource for each radio control unit of an accommodation station realizing the radio control unit, which controls an antenna function of a radio base station, with a virtual machine technology,
wherein:
the control of the assigned amount is carried out by carrying out scale-up, scale-down, or scale-out of the computation resource, and
whether the scale-out is carried out or not is determined based on frequency of the scale-up, when it is possible to carry out the scale-up.

4. A non-transitory computer readable recording medium recorded with a resource control program causing a computer to execute:
a resource control function of carrying out a control of an assigned amount of computation resource for each radio control unit of an accommodation station realizing the radio control unit, which controls an antenna function of a radio base station, with a virtual machine technology,
wherein the resource control function:
carries out the control of the assigned amount by carrying out scale-up, scale-down, or scaleout of the computation resource, and
determines whether to carry out the scale-out or not based on frequency of the scale-up when it is possible to carry out the scale-up.

* * * * *

UNITED STATES PATENT AND TRADEMARK OFFICE
CERTIFICATE OF CORRECTION

PATENT NO. : 10,356,713 B2
APPLICATION NO. : 15/960643
DATED : July 16, 2019
INVENTOR(S) : Tomohiro Nishikawa Page 1 of 1

It is certified that error appears in the above-identified patent and that said Letters Patent is hereby corrected as shown below:

In the Claims

Column 12, Line 58; In Claim 4, after "scale-up", insert --,--

Signed and Sealed this
Fifth Day of November, 2019

Andrei Iancu
*Director of the United States Patent and Trademark Office*